March 24, 1959

H. B. WHITMORE 2,878,942

FILTER UNIT

Filed July 13, 1955

INVENTOR
HORACE B. WHITMORE

ATTY

March 24, 1959   H. B. WHITMORE   2,878,942
FILTER UNIT

Filed July 13, 1955   3 Sheets-Sheet 2

INVENTOR
HORACE B. WHITMORE

ATTY.

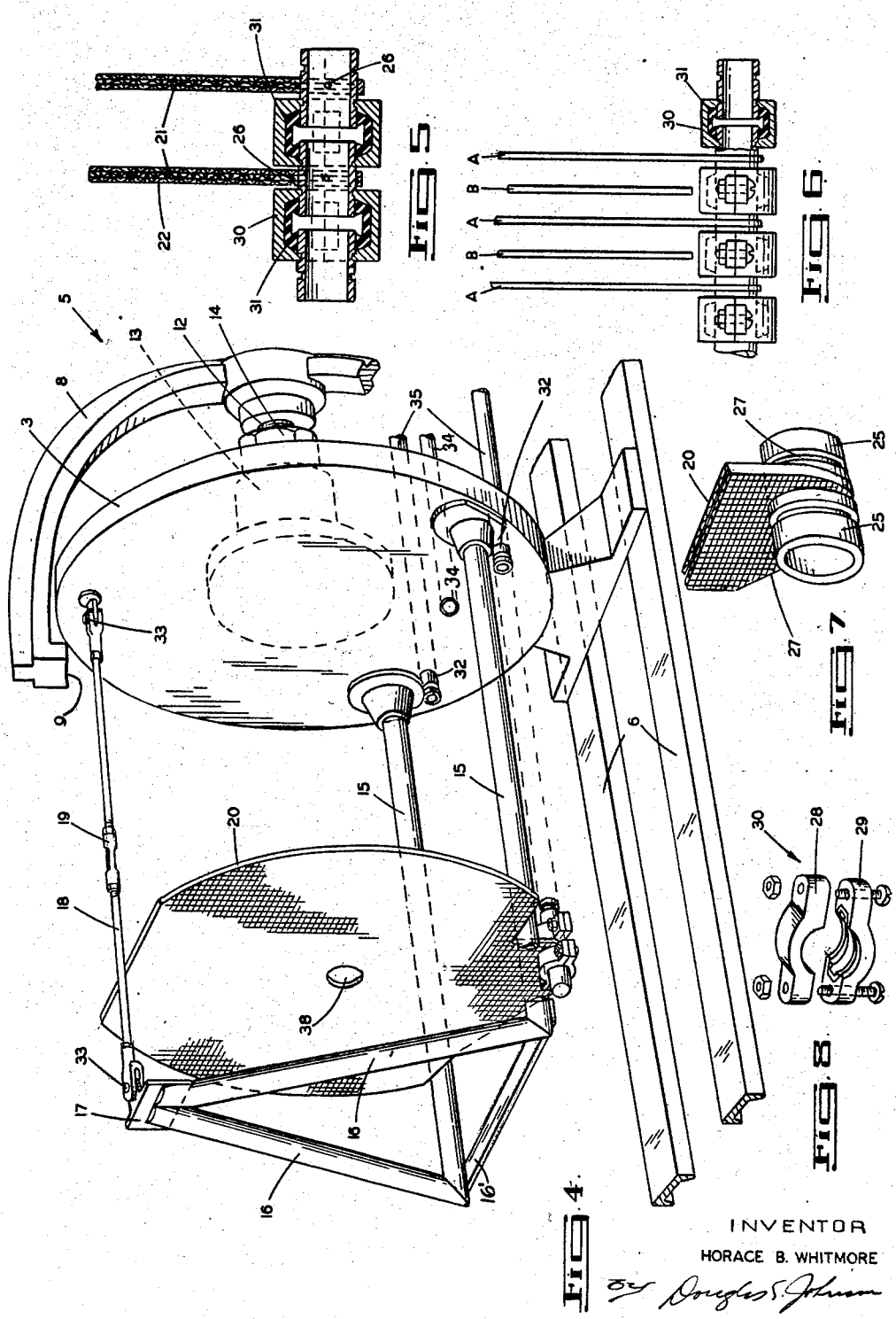

United States Patent Office 2,878,942
Patented Mar. 24, 1959

2,878,942
FILTER UNIT
Horace B. Whitmore, Toronto, Ontario, Canada
Application July 13, 1955, Serial No. 521,832
14 Claims. (Cl. 210—346)

This invention relates to improvements in filters, particularly pressure filters of the type wherein a plurality of clarifier or filter leaves are arranged within a removable shell and the liquid to be filtered is introduced into the shell usually under pressure and the filtrate is drawn or led off through an exit conduit to which the filter leaves are connected.

The function of the filter, of course, is the ability of the filter elements or leaves to screen out the foreign matter from the liquid allowing the filtered liquid or effluent to pass. The build up or crust accumulating on the filter elements or leaves must be removed before it clogs the filter elements and provision is made for sluicing off this accumulation. In the event that one of the filter elements becomes punctured or damaged it must be removed or the foreign material in the liquid will pass through the filter. Also it is desirable to remove the filter elements when they become clogged to a point where normal cleaning is not effective.

With filters of this type presently in use, the removal of individual filter elements or leaves is usually impossible and at best is an arduous and time consuming task since the leaves are normally permanently connected to an exit conduit. For instance, to get at inner leaves of a filter leaf assembly, the outer leaves must be first released and slid off the conduit shaft, requiring that the filter be put out of operation for an extended period.

It is therefore one of the prime objects of the present invention to greatly facilitate the installation and removal of the filter elements or leaves of a filter leaf assembly so that the elements can be individually removed for repair, cleaning or replacement.

Another important object is to provide an arrangement of filter leaves which will enable the leaves to be closely packed to provide a high filtering capacity for a given filter size without detracting from the removability of the filter elements.

Again it is an object to eliminate the necessity of a separate exit conduit, onto which the filter leaves are assembled, presently required.

With present type filters sluicing off of the filter elements is usually effected by an oscillating nozzle directing liquid jets to sweep the filtering surfaces. As these jets must scour surface areas at a substantial distance from the nozzle high liquid pressures are required.

It is another object of the present invention to provide for more efficient sluicing off of the filtering surfaces enabling the liquid pressure required to be reduced.

Again it is an object to provide a filter as aforesaid of sturdy economical construction which will enable ready application of the shell to provide a positively sealed filter pressure chamber and which will enable removal of the shell with equal facility.

One of the important features of the invention resides in providing each filter element or leaf with a short outlet conduit section adapted to be coupled to corresponding sections of adjoining leaves whereby the coupling of the leaves together automatically forms the effluent exit conduit thereby dispensing with the conventional separate conduit member while at the same time rendering the leaves readily separable for removal.

Another important feature resides in providing a novel cantilever frame cage to support the separable leaves.

Still another important feature resides in arranging the filter leaves in sets to provide two or more effluent outlet or exit conduits with the one set interleaving with the other whereby the leaves can be closely packed without in any way interfering with their removability.

Again an important feature resides in providing a removable load carrying "tie" for supporting the cantilever frame cage in extended relation, yet readily removable to enable the filter leaves to be inserted into and removed from the cage.

These and other objects and features will become apparent from the following detailed description taken in conjunction with the accompanying drawings, in which:

Figure 4 is an enlarged part sectional part perspective view of the filter element supporting structure of the filter, showing one of the filter elements in position.

Figure 5 is an enlarged vertical sectional detail showing the manner in which adjoining filter elements are connected to form the discharge conduit.

Figure 6 is a fragmentary part elevational part vertical sectional view showing the manner in which the filter elements are connected, and showing the interleaved relationship of the filter elements of different sets.

Figure 7 is a part sectional part perspective detail of the filter element showing the manner in which it is provided with outlet conduit sections.

Figure 8 is a perspective exploded detail of the means of coupling the conduit sections of the filter elements to form the discharge effluent conduit.

Figure 1:
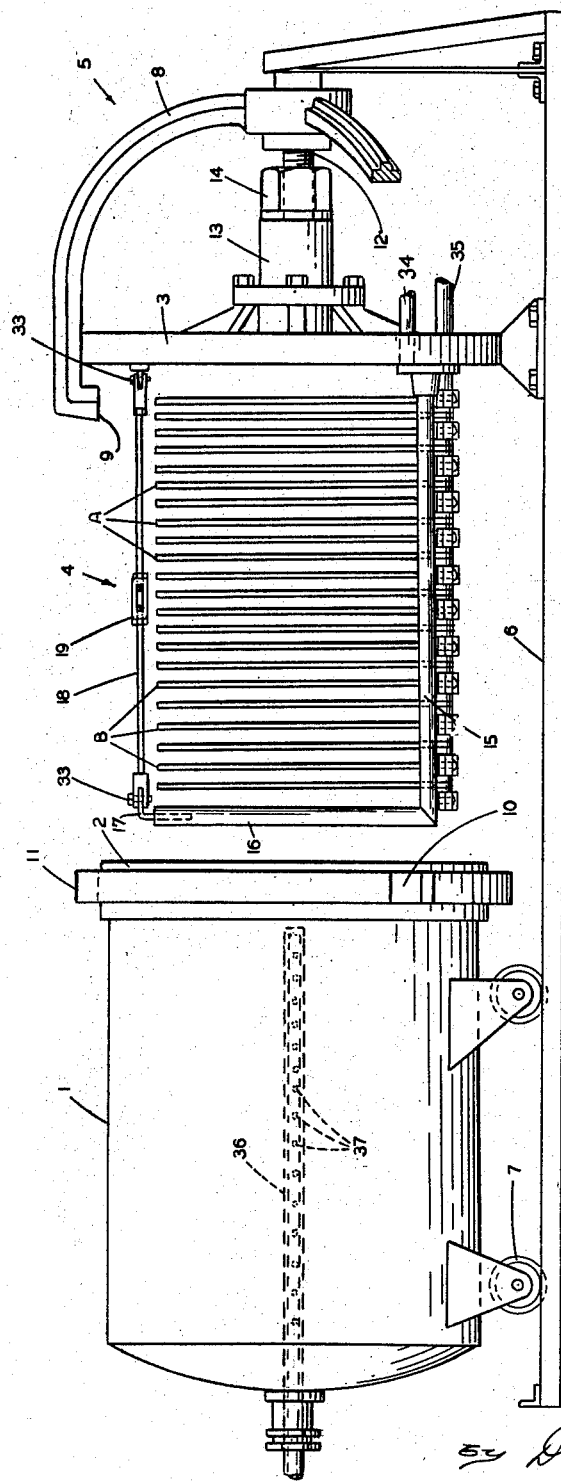
Figure 1 is a side elevational view of a filter embodying the invention and showing the shell and filter element carrying assembly separated.
Figure 2:
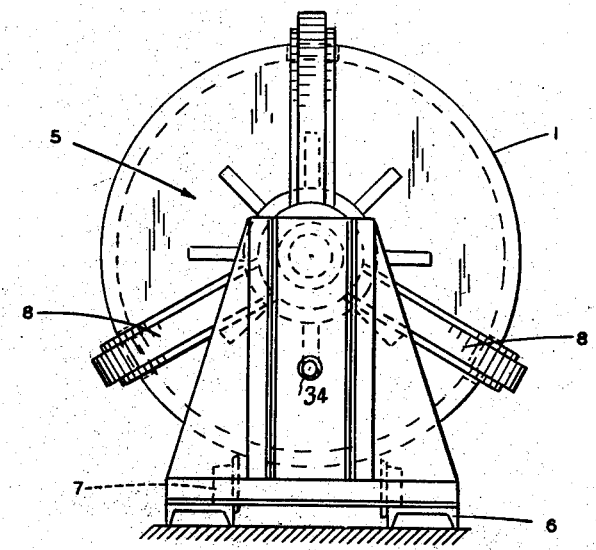
Figure 2 is an end elevation of the device of Figure 1.

With reference first to Figure 1, a filter of the type with which the invention is particularly concerned is shown as comprising a shell 1 open at one end 2 and a head 3 carrying a filter leaf assembly generally designated at 4, which is adapted to close the open end of the shell 1 when the shell and head are assembled and locked together by a locking mechanism generally designated at 5.

The shell 1 and head 3 are relatively separable and in the embodiment of the invention shown, the head is anchored to a pair of fixed rails 6, while the shell 1 is mounted on rollers 7 to roll along the rails 6, into and out of engagement with the head 3.

The locking mechanism 5 comprises a swing locking yoke 8 provided with downturned locking lips 9 which with the yoke in one position of rotation register with corresponding notches 10, formed in a circumferential flange 11 carried by the shell 1. With the shell and head in abutment and the yoke 8 swung to bring the lips 9 into register with the notches 10, the lips are projected through the notches and on rotation of the yoke engage behind the shell flange 11.

The yoke 8 is slidably mounted on the piston end 12 of a hydraulic cylinder 13. The piston end or rod 12 is threaded to receive thereon an adjusting nut 14. The nut 14 is located so that with the yoke slid inwardly to its locking position with its lips 9 engaging behind the flange 11 the yoke will be immediately adjacent the nut so that a small movement of the hydraulic ram effects tensioning of the shell flange 11 against a suitable gasket carried by the flange 11 or head 3.

The filter leaf assembly comprises a filter leaf frame supporting cage formed of a pair of members 15, which may for instance be bars or pipes, carried by the stationary head 3 and projecting outwardly therefrom. The members 15 have at their outer or free ends upturned members 16 which converge upwardly, and form in effect an A frame carrying at their upper ends a pivot lug formation 17. To provide lateral stability a bar 16' is secured between the members 15 at their unsupported ends.

Pivoted to the lug 17 and to the head 3 is a tie rod formation 18 including a turn buckle 19 to provide an adjustable tension between the upper end of the A frame formed by the upturned members 16, and the stationary head 3. The cage assembly formed by the members 15 and 16, and the tie rod 18 thus forms a cantilever or truss frame which is securely supported under the tension afforded by the tie rod formation.

Figure 3:
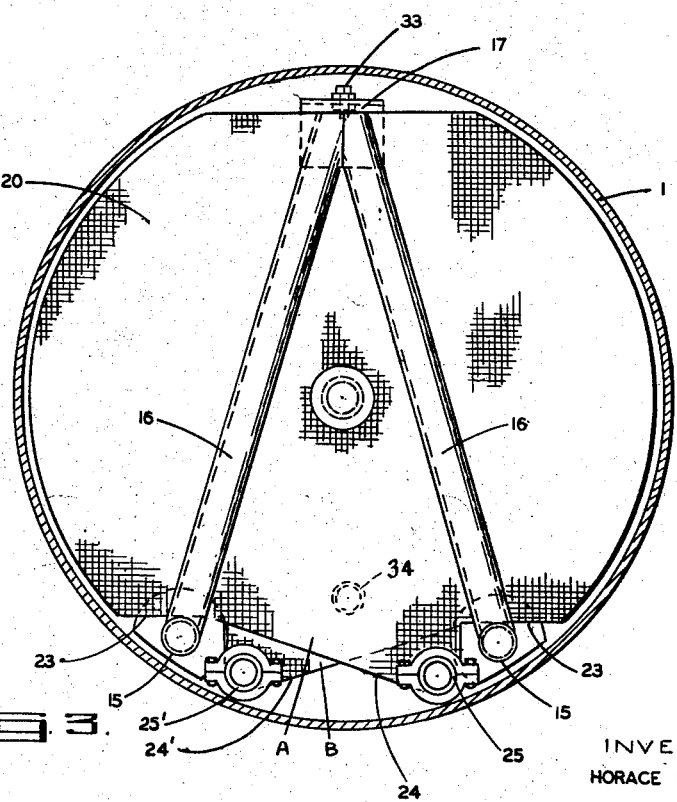
Figure 3 is an enlarged vertical section taken through the filter device with the filter assembled.

The filter elements 20 supported by the cantilever cage comprise filter leaves of flat generally laminar formation. These filter leaves may, for instance, comprise a coarse wire screen 21 as a support frame covered by a fine mesh screen 22 as shown particularly in Figure 5. As shown in Figures 1, 3 and 6, the filter embodies two sets of filter leaves 20, the leaves of one set being indicated at A, and the leaves of the other set being indicated at B. The leaves of the set A, as shown in Figures 3 and 4, are formed with flattened sections 23 at their bottom edges, and these sections are adapted to rest on and be supported by the members 15 of the cantilever cage.

Between the sections 23 of the leaves of set A, these leaves project downwardly to the right as viewed in Figure 3 to form an apex portion 24. Secured to this apex portion 24 as seen particularly in Figures 5 and 7, and extending on each side of the laminar formation of the filter leaf, is a short length of outlet conduit 25 which is in communication through orifices 26 (Figure 5) with the interior of the filter leaf.

The outlet conduit sections 25 of each filter leaf are each provided with a groove 27 with which component clamp members 28 and 29 of a coupling device generally designated at 30 in Figure 8, are adapted to cooperate to lock the conduit sections 25 of adjoining filter leaves together to form a continuous discharge conduit leading from the interiors of the connected filter leaves as indicated in Figures 5 and 6.

The coupling device 30 employs gasket formations 31 as seen particularly in Figures 5 and 6, to provide a liquid seal.

The filter leaves of set B are similar to the leaves of set A, with the exception that, as seen in Figure 3, the intermediate bottom edge portion projects downwardly to the left to form the apex portion 24' which carries the outlet conduit sections 25'.

By providing each filter leaf 20 with an outlet conduit section whereby the assembly of the filter leaves forms the effluent discharge conduit, no separate discharge conduit is required, and the filter leaves are relatively separable for removal and replacement, by simply undoing the coupling 30 between the filter leaf to be removed and the adjoining leaves. After removal, the remaining leaves, with the replaced leaf, can be immediately reconnected to reform the discharge conduit.

By providing two sets of filter leaves, set A and set B, and interleaving the filter leaves as shown particularly in Figure 6, the filter leaves can be closely packed and yet the removable feature maintained. If closer packing of the filter leaves is required, further sets of filter leaves could be provided as readily apparent, providing in place of the two discharge conduits indicated at 32, Figure 4, three or more of such discharge conduits could be provided.

To insert or remove the filter leaves 20, the cantilever cage carried by the head 3 may be "opened" by removing one of the pivot pins 33 at one end of the tie rod formation, and swinging the tie rod about the other pivot clear of the filter leaf assembly.

In operation, the shell is assembled with the head and locked in position by the yoke 8 and hydraulic device 13, and the liquid to be filtered is introduced into the casing formed by the shell and head through any suitable inlet, such as indicated at 34. The liquid then passes through the fine mesh screen 22 into the central portion of the filter leaves and into the discharge conduits 32 which are connected through a suitable discharge passage formation comprising the outlets 35 forming two passages through the head 3. The liquid is normally introduced into the filter under pressure and the solids or impurities are removed by the screen 22 and the clear liquid is removed at the outlets 35.

In order to effect a sluicing off of the screen surfaces 22, the shell 1 is provided with a central pipe 36 formed with a plurality of fine discharge openings 37. The filter elements or leaves 20 are formed with central orifices 38 which are sealed off from the interior of the filter elements, and when the shell 1 is assembled with the head 3, the central pipe 36 is projected through the orifices 38.

By introducing a suitable cleansing solution under high pressure into the assembled filter through the pipe 36, the liquid is projected as high pressure jets to scour the filter leaves issuing from the effective nozzles formed by the pipe discharge openings 37. The pipe may be provided with openings on all sides so that the jets are directed radially outwardly in all directions to scour the filter leaves from the centre outwardly. Alternatively, the openings may be arranged on one side of the pipe only, and the pipe may be rotated in the scouring action.

With this arrangement of a central "slucing" pipe, all areas of the filter leaves are effectively scoured, as the maximum distance of any particular area from the jet nozzle is approximately one-half the dimension of the filter leaf.

It will be understood that variations in details of construction and other modifications of form may be made within the spirit of the invention as defined in the appended claims.

What I claim as my invention is:

1. In a filter, at least two sets of filter leaves, the leaves of each set being provided with an integral outlet conduit section, means for coupling each of said integral conduit sections of the leaves of each set to one another in series to form the conduit sections of the set into an effluent discharge conduit to provide at least two discharge conduits from the filter, the leaves of one set being interleaved with the leaves of the other set.

2. In a filter, a casing having an inlet, at least two sets of filter elements, means supporting said filter elements in said casing with each of said filter elements having an integral outlet conduit section, and coupling means for connecting the outlet conduit sections of each set of filter elements to one another in series to define a continuous pair of discharge conduits with which the filter elements of each set are in communication respectively, said casing being provided with outlet means to which said pair of discharge conduits of each of said filter element sets are connected, the leaves of one set being interleaved with the leaves of the other set.

3. A filter comprising a casing provided with inlet and a pair of discharge passage formations communicating with the casing interior, a plurality of filter leaves each including an outlet conduit section and arranged alternately in interleaved relation whereby the outlet conduit sections of each alternate leaf lie next adjacent to one another, a cage formation disposed within said casing for supporting said filter leaves, and means for coupling each of said next adjacent outlet conduit sections of said filter leaves to one another in series to form a pair of continuous effluent exit conduits connectable with said discharge passage formations.

4. A pressure type filter assembly comprising a casing provided with inlet and a pair of discharge passage formations including a shell open at one end, and a cooperating head adapted to close the open end of said shell, a cantilever cage assembly carried by said head, a plurality of filter leaves removably mounted in said cage assembly, each of said filter leaves including an outlet conduit section said leaves being arranged in said cage assembly alternately in interleaved relation whereby the outlet conduit sections of each alternate leaf lie next adjacent to one another, and coupling means externally connecting each of said next adjacent outlet sections of said filter leaves to one another in series to form a pair of exit conduits, said exit conduits being connectable to said casing discharge passage formations.

5. A pressure type filter assembly comprising a casing provided with inlet and at least two discharge passage formations and including a shell open at one end and a cooperating head adapted to close the open end of said shell, a cantilever cage assembly carried by and extending outwardly from said head and including an adjustable reinforcing tie member for supporting said cage assembly in said outwardly extending position, and at least two sets of interleaved filter elements supported by said cage assembly the filter elements of each set being provided with an integral outlet conduit section, means for coupling each of said integral conduit sections of the filter elements of each set to one another to form the conduit sections of the set into an effluent discharge conduit to provide at least two discharge conduits from the filter, each of the effluent discharge conduits being connected with the two discharge passage formations, respectively.

6. A pressure type filter assembly comprising a casing provided with inlet and discharge passage formations and including a pair of relatively separable members comprising a shell open at one end and a cooperating head adapted to close the open end of said shell, a cantilever cage assembly carried by said head, said cage assembly comprising longitudinal support bars projecting outwardly from said head and having an angularly turned formation at their outer ends, and a reinforcing tie rod connected between said angularly turned formation and said head, and a plurality of filter elements supported on said support bars and in communication with said discharge passage formation.

7. A device as claimed in claim 6 in which each of said filter elements comprises a generally laminar filter leaf including an outlet conduit section extending on each side thereof adjacent to one edge, and means connecting the outlet conduit sections of said filter leaves to form an effluent discharge conduit, said discharge conduit being connected to said discharge passage formation.

8. A device as claimed in claim 7 in which said filter leaves are formed with central openings therethrough, and said casing is provided with a sluice pipe having discharge orifices therein insertable through said central openings.

9. A device as claimed in claim 6 in which said filter elements comprise generally laminar filter leaves, each provided with an outlet conduit section in communication with the interior of the leaf, said leaves being supported on said support bars and disposed between said support bars and tie rod and means for releasably coupling the conduit sections of said filter leaves together to form a continuous effluent discharge conduit, said discharge conduit being connected to said discharge passage formation.

10. A device as claimed in claim 9 in which said tie rod is adjustable in length.

11. A device as claimed in claim 9 in which said tie bar is releasably secured to at least one of said head and angularly turned formation and movably supported from the other of said head and angularly turned formation, whereby said tie rod is releasable for insertion and removal of said filter leaves.

12. A device as claimed in claim 6 in which said filter elements comprise at least two sets of substantially laminar filter leaves, the leaves of each set being formed to project beyond the leaves of the other set at a point on their perimeters, said leaves of each set at the points projecting beyond the leaves of the other set being provided with outlet conduit sections projecting on each side thereof, and in communication with the interiors of the leaves, means for releasably connecting the outlet conduit sections of the leaves of each set to form a continuous discharge conduit in communication with the interiors of the leaves of such set, the discharge conduits of each set of leaves discharge through said discharge passage formation.

13. A device as claimed in claim 12 in which said discharge passage formation comprises a pair of discharge openings leading through said head, each of said discharge openings being in communication with one of said discharge conduits.

14. A device as claimed in claim 12 in which the filter leaves of said sets of filter leaves are interleaved.

References Cited in the file of this patent

UNITED STATES PATENTS

| | | |
|---|---|---|
| 864,308 | Kelly | Aug. 27, 1907 |
| 867,734 | Knock | Oct. 8, 1907 |
| 1,282,280 | Peck | Oct. 22, 1918 |
| 1,305,317 | Sweetland | June 3, 1919 |
| 1,371,634 | McCaskell | Mar. 15, 1921 |
| 1,734,652 | Sweetland | Nov. 5, 1929 |
| 2,061,351 | Denhard | Nov. 17, 1936 |
| 2,221,210 | Soderquist | Nov. 12, 1940 |
| 2,328,148 | Jacobowitz | Aug. 31, 1943 |
| 2,381,453 | Hunziker | Aug. 7, 1945 |